US012681821B2

(12) United States Patent
Yi et al.

(10) Patent No.: US 12,681,821 B2
(45) Date of Patent: Jul. 14, 2026

(54) TEST METHOD AND SYSTEM BASED ON VARIABLE COMBINATION TIME SEQUENCE FUNCTION COVERAGE

(71) Applicant: Jinan Xinyu Software Technology Co., Ltd., Jinan (CN)

(72) Inventors: Min Yi, Jinan (CN); Ming Wei, Jinan (CN); Min Cheng, Jinan (CN); Yunzhao Yang, Jinan (CN); Chuanqiang Shen, Jinan (CN); Tianhao Yi, Jinan (CN)

(73) Assignee: Jinan Xinyu Software Technology Co., Ltd., Jinan (CN)

( * ) Notice: Subject to any disclaimer, the term of this patent is extended or adjusted under 35 U.S.C. 154(b) by 135 days.

(21) Appl. No.: 18/726,459

(22) PCT Filed: Apr. 13, 2023

(86) PCT No.: PCT/CN2023/088062
§ 371 (c)(1),
(2) Date: Nov. 26, 2024

(87) PCT Pub. No.: WO2024/051162
PCT Pub. Date: Mar. 14, 2024

(65) Prior Publication Data
US 2025/0342095 A1     Nov. 6, 2025

(30) Foreign Application Priority Data

Sep. 8, 2022   (CN) ........................ 202211092427.X

(51) Int. Cl.
G06F 11/00     (2006.01)
G06F 11/28     (2006.01)
(52) U.S. Cl.
CPC ................................... G06F 11/28 (2013.01)

(58) Field of Classification Search
CPC .... G06F 11/1469; G06F 11/073; G06F 11/28; G06F 11/0793
See application file for complete search history.

(56) References Cited

U.S. PATENT DOCUMENTS

| | | | | |
|---|---|---|---|---|
| 6,393,594 | B1 * | 5/2002 | Anderson ...... | G01R 31/318385 714/724 |
| 2002/0073373 | A1 * | 6/2002 | Nakao .................... | G11C 29/10 714/728 |

(Continued)

FOREIGN PATENT DOCUMENTS

| | | |
|---|---|---|
| CN | 1873625 A | 12/2006 |
| CN | 115168240 A | 10/2022 |

OTHER PUBLICATIONS

International Search Report of PCT Patent Application No. PCT/CN2023/088062 issued on Jul. 10, 2023.

(Continued)

*Primary Examiner* — Jason B Bryan

(57)     ABSTRACT

A test method and system based on a variable combination time sequence function coverage are provided, where the method includes: constructing a variable combination time sequence function coverage structure, and using the variable combination time sequence function coverage structure as a random constraint; determining a random seed of each value range of each variable in the variable combination time sequence function coverage structure; sequentially obtaining a time point as a current time point based on a time sequence of the variable combination time sequence function coverage structure; obtaining a value segment of each variable at the current time point from the variable combination time sequence function coverage structure, to form a variable combination structure at the current time point; and for the (Continued)

variable combination structure at the current time point, generating a random excitation of each variable to perform testing in a current scenario.

16 Claims, 3 Drawing Sheets

(56)                    References Cited

U.S. PATENT DOCUMENTS

2009/0106615 A1 *   4/2009   Nakakita ................. G06F 11/26
                                                                    714/739
2015/0226801 A1 *   8/2015   Hopkins .......... G01R 31/31725
                                                                    714/731

OTHER PUBLICATIONS

1st Office Action of counterpart Chinese Patent Application No. 202211092427.X issued on Oct. 26, 2022.
Written Opinion of PCT Patent Application No. PCT/CN2023/088062 issued on Jul. 10, 2023.

* cited by examiner

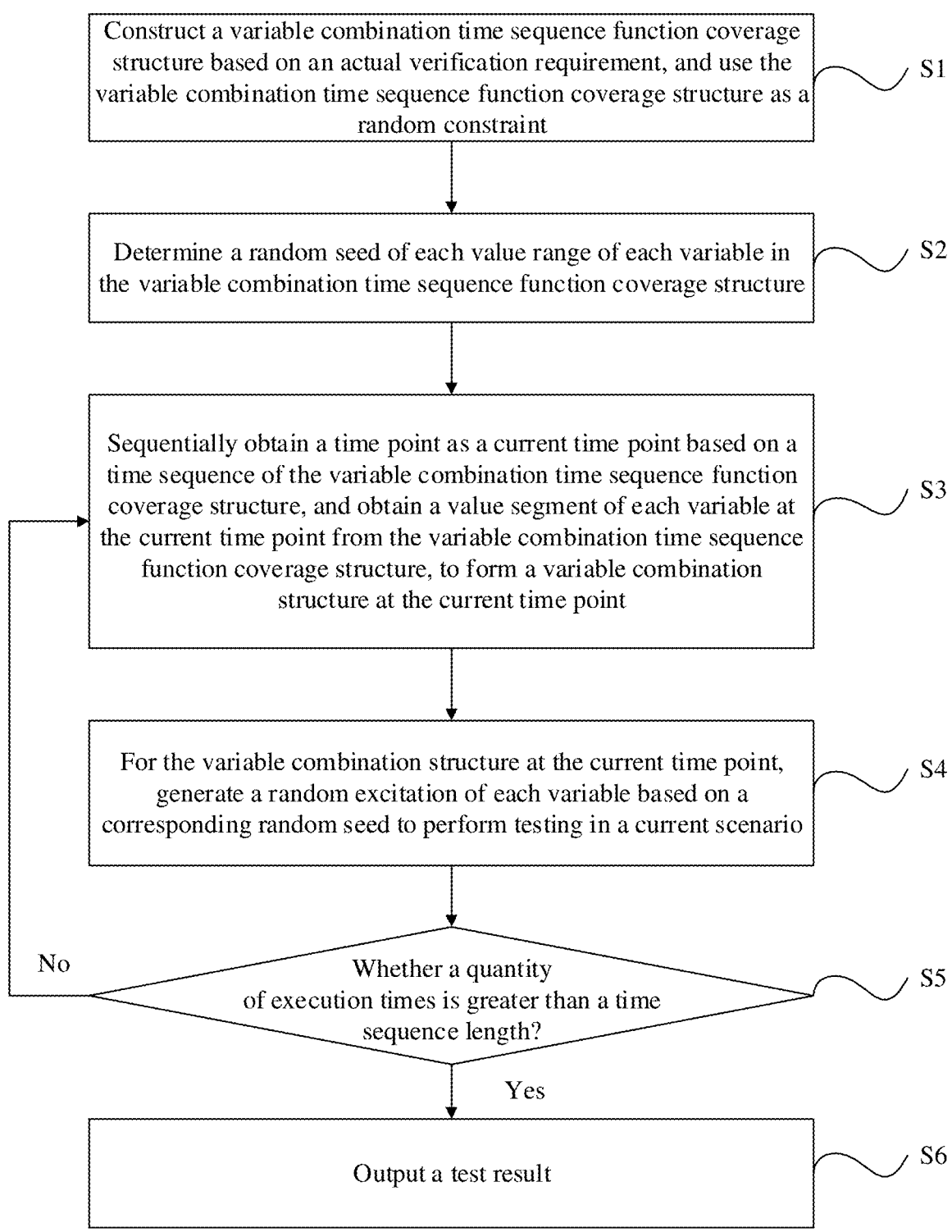

Construct a variable combination time sequence function coverage structure based on an actual verification requirement, and use the variable combination time sequence function coverage structure as a random constraint — S1

Determine a random seed of each value range of each variable in the variable combination time sequence function coverage structure — S2

Sequentially obtain a time point as a current time point based on a time sequence of the variable combination time sequence function coverage structure, and obtain a value segment of each variable at the current time point from the variable combination time sequence function coverage structure, to form a variable combination structure at the current time point — S3

For the variable combination structure at the current time point, generate a random excitation of each variable based on a corresponding random seed to perform testing in a current scenario — S4

No — Whether a quantity of execution times is greater than a time sequence length? — S5

Yes

Output a test result — S6

FIG. 1

TEST METHOD AND SYSTEM BASED ON VARIABLE COMBINATION TIME SEQUENCE FUNCTION COVERAGE

CROSS-REFERENCE TO RELATED APPLICATION

This application claims the benefit of Chinese Patent Application No. 202211092427. X, filed on Sep. 8, 2022, which is hereby incorporated by reference in its entirety including any tables, figures, or drawings.

TECHNICAL FIELD

The present disclosure relates to the technical fields such as chip verification (testing) and software testing, and specifically, to a test method and system based on a variable combination time sequence function coverage.

BACKGROUND

In chip verification, a large quantity of test cases are obtained through scenario analysis. These test cases are used to describe a configuration of a chip, an excitation generated by the chip, and an expected result of the chip. This is related to a plurality of factors and value ranges of the factors. Importantly, these scenarios that need to be covered further need to be counted to determine which configuration, excitation, and expected result have been tested or not tested. This type of coverage is referred to as a combination or cross coverage (cross coverage), and is collectively referred to as a combination coverage for ease of description below.

Another scenario varies from a value to another value in different time for one or more factors, that is, a time dimension is added, and a scenario varying with time is referred to as a time sequence function coverage.

An existing time sequence function coverage is defined by using a covergroup-coverpoint-bins structure. This technology has the following defects:

(1) Implementation is complex. To meet a requirement of a compiler, a large quantity of additional information needs to be input, and an effective information density is low, causing a large programming workload.

(2) Only a time sequence of a single variable can be defined, and time sequences of a plurality of variables cannot be supported. However, an actual verification requirement is as follows: In a time sequence, that is, at a same moment, values of a plurality of variables often need to be combined. Therefore, an existing time sequence function coverage cannot meet the verification requirement.

(3) No corresponding constraint syntax or means is provided to achieve a goal of the time sequence function coverage.

(4) A weight cannot be set for a segment in a bin, and the verification requirement cannot be met.

SUMMARY

To resolve a problem in a conventional technology that a workload is large and an actual verification requirement cannot be met, the present disclosure provides a test method based on a variable combination time sequence function coverage. In the present disclosure, based on a simplified variable combination time sequence function coverage structure and a random test algorithm, a test goal of the multi-variable combination time sequence function coverage is efficiently implemented.

The present disclosure is implemented by the following technical solutions:

A test method based on a variable combination time sequence function coverage includes:

constructing a variable combination time sequence function coverage structure based on an actual verification requirement, and using the variable combination time sequence function coverage structure as a random constraint, where the variable combination time sequence function coverage structure is used to represent a relationship in which a single variable varies with time or a relationship in which a combination of at least two variables varies with time;

determining a random seed of each value range of each variable in the variable combination time sequence function coverage structure;

sequentially obtaining a time point as a current time point based on a time sequence of the variable combination time sequence function coverage structure;

obtaining a value segment of each variable at the current time point from the variable combination time sequence function coverage structure, to form a variable combination structure at the current time point;

for the variable combination structure at the current time point, generating a random excitation of each variable based on a corresponding random seed to perform testing in a current scenario; and returning to the step of sequentially obtaining a time point as a current time point based on a time sequence of the variable combination time sequence function coverage structure, until the entire time sequence is traversed.

In some embodiments, the constructed variable combination time sequence function coverage structure is a three-layer structure;

curly brackets "{ }" are used at a first layer to indicate a time sequence of one variable or a combined time sequence of at least two variables;

square brackets "[ ]" are used at a second layer to indicate all value segments of each variable;

square brackets "[ ]" are used at a third layer to indicate a value range and/or a weight of each segment; and quantities of value segments of the variables are the same, and are equal to a time sequence length.

In some embodiments, the weight is used to represent a repetition quantity of the value range, and is represented by adding "*W" after the square brackets "[ ]" of the value range, and W represents a weight value.

In some embodiments, the weight value W is less than or equal to the time sequence length N.

In some embodiments, when the weight value W is equal to the time sequence length N, a default value is obtained.

In some embodiments, the value range includes a numerical value in which the first and last numerical values are equal or a numerical value range in which the first and last numerical values are unequal.

In some embodiments, the random seed is used to ensure that a random excitation generated in each test is capable of being reproduced.

In some embodiments, the generated random excitation is as follows:

if the value range of the variable is a single numerical value, the single numerical value is directly returned as the random excitation; or if the value range of the variable is a numerical value range, a random number is generated in the numerical value range as the random excitation.

In some embodiments, the method further includes: outputting a test result.

In some embodiments, when the weight value W is 0, it indicates that a value range corresponding to the weight value is ignored, and the value range does not belong to a part of a sequence; and when the weight value W has a negative sign, the negative sign indicates an invalid sequence, and provided that a weight value W of a value range in a sequence has a negative sign, it indicates that the sequence is an invalid sequence.

According to another aspect, the present disclosure provides a test system based on a variable combination time sequence function coverage, including:

a construction module, configured to: construct a variable combination time sequence function coverage structure based on an actual verification requirement, and use the variable combination time sequence function coverage structure as a random constraint, where the variable combination time sequence function coverage structure is used to represent a relationship in which a single variable varies with time or a relationship in which a combination of at least two variables varies with time;

a random seed selection module, configured to determine a random seed of each value range of each variable in the variable combination time sequence function coverage structure;

a combination sequence module, configured to: sequentially obtain a time point as a current time point based on a time sequence of the variable combination time sequence function coverage structure, and obtain a value segment of each variable at the current time point from the variable combination time sequence function coverage structure, to form a variable combination structure at the current time point; and a random test module, configured to: for the variable combination structure at the current time point, generate a random excitation of each variable based on a corresponding random seed to perform testing in a current scenario.

1. In the present disclosure, a variable combination time sequence function coverage target structure is constructed, and the variable combination time sequence function coverage target structure is directly used as a random constraint to generate a random excitation, so that a coding workload can be greatly reduced, and coding efficiency and test efficiency are improved. In addition, with reference to a test algorithm, a target can be directly hit, and a goal of a 100% function coverage can be implemented, which compensates for the lack of functions of a combination constraint and a time sequence constraint in a conventional technology.

2. In an existing manner in which an overall weight is set for coverpoint, cross, and covergroup, it only makes sense to calculate overall coverage data, and an actual verification requirement cannot be reflected. In the present disclosure, a weight can be set for bins, which can better reflect an essence of the actual verification requirement, and meet the actual verification requirement.

BRIEF DESCRIPTION OF DRAWINGS

The accompanying drawing described herein is used to provide further understanding of embodiments of the present disclosure, and constitutes a part of the present application, but does not constitute limitations to the embodiments of the present disclosure. In the accompanying drawings:

FIG. 1 is a schematic flowchart of a method according to an embodiment of the present disclosure;

DESCRIPTION OF EMBODIMENTS

Figure 2:
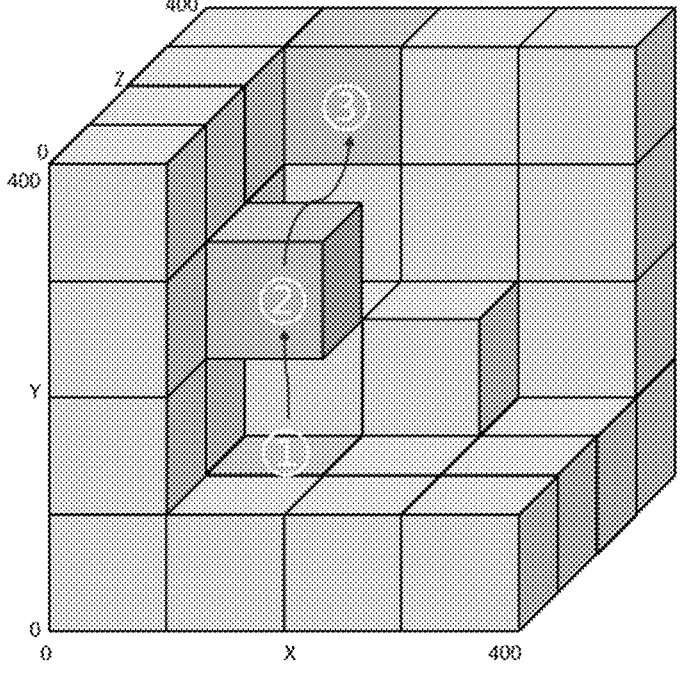
FIG. 2 shows an example of a multi-variable combination time sequence function coverage according to an embodiment of the present disclosure.

To make the objectives, technical solutions and advantages of the present disclosure clearer, the present disclosure is further described in detail below with reference to embodiments and the accompanying drawing. The schematic implementations of the present disclosure and descriptions thereof are only used to explain the present disclosure, but are not intended to limit the present disclosure.

Embodiment 1

A conventional time sequence function coverage is defined by using a covergroup-coverpoint-bins syntax structure in the System Verilog language, which can define only a case in which a single variable varies with time, and cannot describe a combination relationship between a plurality of variables. As a result, an actual verification requirement cannot be met. In addition, in a conventional technology, when a time sequence function coverage is defined, a complex program is required, which consumes a large amount of manpower and material resources, causing low test efficiency and the like. In view of this, embodiments of the present disclosure provide a test method based on a variable combination time sequence function coverage. In the embodiments of the present disclosure, a variable combination time sequence function coverage structure and a corresponding test algorithm are used, so that coding burden is greatly reduced, and coding efficiency is improved, thereby improving test efficiency.

Specifically, as shown in FIG. 1, the test method provided in Embodiment 1 of the present disclosure specifically includes the following steps:

Step S1: Construct a variable combination time sequence function coverage structure based on an actual verification requirement, and use the variable combination time sequence function coverage structure as a random constraint.

Specifically, the multi-variable combination time sequence function coverage structure constructed in this embodiment of the present disclosure is a three-layer structure in which a first layer, a second layer, and a third layer are sequentially arranged from the outside to the inside. The first layer represents a time sequence of one variable or a combined time sequence of at least two variables, the second layer represents all value segments of each variable, and the third layer represents a value range of each value segment. The value range may be a numerical value or a numerical value range. It should be noted that the numerical value may also be considered as a special case of the numerical value range. At the third layer, a weight of the value range may be further represented in a manner of "*w", namely, a repetition quantity of the value range, and W represents a weight value. Generally, the weight value W is less than or equal to a time sequence length N. In a special case, the weight W may be 0, indicating that the value range is ignored, and the value range does not belong to a part of a sequence. In addition, W may have a negative sign, the negative sign indicates an invalid sequence, and provided that a weight of a value range has a negative sign, it indicates that the sequence is an invalid sequence. Because all variables vary with a time sequence, quantities of value segments of the variables are the same, that is, the quantity of value segments is equal to the time sequence length N. In this case, the variable combination time sequence function coverage structure used in this embodiment of the present disclosure may be represented as follows:

```
sequence s1 = {
    //variable X
    [[100, 200]],
    //variable Y
    [[0, 100], [200, 300], [300, 400]],
    //variable Z
    [[100, 200], [100, 200], [300, 400]]
}
```

That is, in the foregoing three-layer structure, curly brackets "{ }" are used at the first layer, which represents that the combined time sequence includes three variables X, Y, and Z. Square brackets "[ ]" are used at the second layer, which represents all value segments of each variable. In this example, the time sequence length is 3. Therefore, the variable X includes three value segments, the variable Y includes three value segments, and the variable Z includes three value segments. Square brackets "[ ]" are used the third layer, which represents a specific numerical value range or a specific numerical value of each value segment. The specific combined time sequence of the foregoing sequence data structure is described as follows:

[[100, 200], [0, 100], [100, 200]]=>

[[100, 200], [200, 300], [100, 200]]=>

[[100, 200], [300, 400], [300, 400]]

As shown in FIG. 2, the variable combination time sequence function coverage structure provided in this embodiment of the present disclosure may be used to describe a case in which a plurality of variables vary with time. For example, conventionally, the variable X has only one random range. In this embodiment of the present disclosure, not only a change situation of the variable X may be obtained, but also a combined change situation of the variable X, the variable Y, and the variable Z (①=>②=>③ shown in FIG. 2) may be obtained, which better meets an actual verification requirement.

It should be noted that, in this embodiment of the present disclosure, three variables and the time sequence length being 3 are used as an example for description. This is not limited. In another preferred implementation, one variable, two variables, or three or more variables, and another time sequence length may be set based on an actual requirement. In addition, in this embodiment of the present disclosure, each value segment of each variable is a numerical value range. In another preferred embodiment, each value segment may be a numerical value, and the numerical value may also be considered as a special numerical value range. For example, if a value is 100, the value segment may be represented as [100, 100].

To improve programming efficiency and user friendliness, in this embodiment of the present disclosure, the constructed variable combination time sequence function coverage structure may be replaced with the following several manners:

Manner 1: Each variable may include one value segment or N value segments, and N is the time sequence length:

```
sequence s1 = {
    //variable X
    [[100, 200]],
    //variable Y
    [[0, 100], [200, 300], [300, 400]],
    //variable Z
    [[100, 200], [100, 200], [300, 400]]
}
```

In Manner 1, value ranges of the three value segments of the variable X are the same. Therefore, the value range is recorded only once. The value range is used three times by default, that is, there are N values by default.

Manner 2: A repeated value range is described in a weight manner. For example, the three value ranges of the variable X are the same, and therefore may be described in a manner of [100, 200]*3. A value range [100, 200] of the variable Z is repeated twice, and is described in a manner of [100, 200]*2. That is, the so-called weight W represents a repetition quantity, and W is less than or equal to N. If W is equal to N, the weight may be omitted, and repetition is performed N times by default, so that the structure shown in the foregoing Manner 1 is obtained:

```
sequence s1 = {
    //variable X
    [[100, 200] * 3],
    //variable Y
    [[0, 100], [200, 300], [300, 400]],
    //variable Z
    [[100, 200] * 2, [300, 400]]
}
```

In this embodiment of the present disclosure, the variable combination time sequence function coverage is constructed and used as a test constraint. Therefore, not only the variable combination time sequence function coverage is described, but also the variable combination time sequence function coverage is directly used as a random constraint to generate a random excitation. In this way, a large amount of random constraint syntax is eliminated, and this part of coding work is reduced to zero. In addition, the random data directly hits a target, especially hits a combined target at a time, which compensates for the lack of functions of a combination constraint and a time sequence constraint in the conventional technology.

When a conventional time sequence function coverage is defined, only an overall weight can be set, it only makes sense to calculate overall coverage data, and an actual verification requirement cannot be reflected. In this embodiment of the present disclosure, a weight can be further set for a value range, so that the actual verification requirement can be better reflected.

Step S2: Determine a random seed of each value range of each variable in the variable combination time sequence function coverage structure.

In a subsequent test process in this embodiment of the present disclosure, based on the random seed, a series of random numbers are generated, to ensure that a random number generated in each test is capable of being repro-
duced, thereby ensuring a 100% coverage without causing
omission.

Step S3: Sequentially obtain a time point as a current time
point based on a time sequence of the variable combination
time sequence function coverage structure, and obtain a
value segment of each variable at the current time point from
the variable combination time sequence function coverage
structure, to form a variable combination structure at the
current time point.

In this embodiment of the present disclosure, a value
segment is sequentially selected for each variable based on
the time sequence length, to obtain a combination of value
segments of the variable at a time point, namely, a variable
combination structure. Specifically, the foregoing variable
combination time sequence function coverage structure is
used as an example for description:

The variable combination structure that can be obtained
sequentially based on the time sequence length is: [[100,
200], [0, 100], [100, 200]]=>[[100, 200], [200, 300], [100,
200]]=>[[100, 200], [300, 400], [300, 400]].

Step S4: For the variable combination structure at the
current time point, generate a random excitation of each
variable based on a corresponding random seed to perform
testing in a current scenario.

In this embodiment of the present disclosure, an example
in which a multi-variable combination structure in a current
time sequence is [100, 200], [0, 100], [100, 200] is used for
description. In step S4, for a value range of each variable,
based on a corresponding random seed, a random number in
the value range is generated as a random excitation, so that
a random number is obtained for each variable, namely, a
random number in the value range [100, 200] of the variable
X, and a random number in the value range [0, 100] of the
variable Y, and a random number in the value range [100,
200] of the variable Z.

It should be noted that, if there is only one numerical
value in the value range, the numerical value is directly
returned as the random excitation for testing.

Step S5: Repeat step S3 and step S4 based on the time
sequence length, to obtain random excitations of all vari-
ables to complete testing in all scenarios, so as to cover all
the scenarios, that is, to enable the variable combination
time sequence coverage to reach 100%.

Step S6: Output a test result.

Based on the test method provided in this embodiment of
the present disclosure, the variable combination time
sequence coverage can reach 100%, thereby improving
verification efficiency and quality.

An embodiment further provides a computer device,
configured to perform the foregoing method in this embodi-
ment.

Figure 3:
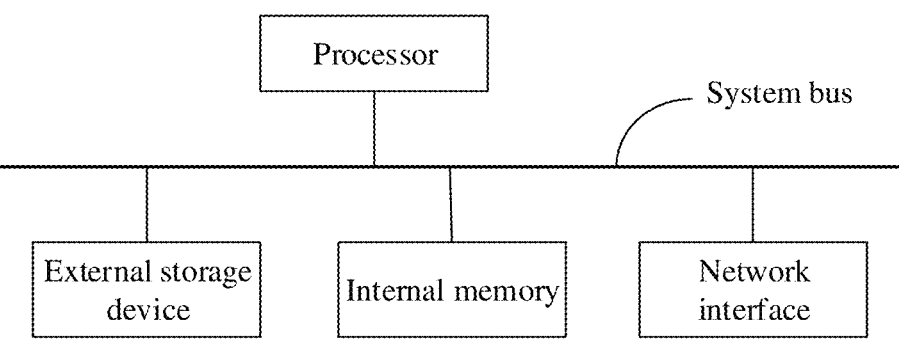
FIG. 3 is a schematic block diagram of a computer device according to an embodiment of the present disclosure.

Specifically, as shown in FIG. 3, the computer device
includes a processor, an internal memory, and a system bus.
Various device components, including the internal memory
and the processor, are connected to the system bus. The
processor is hardware configured to execute a computer
program instruction by using a basic arithmetic and logical
operation in a computer system. The internal memory is a
physical device for temporarily or permanently storing a
computing program or data (for example, program status
information). The system bus may be any one of the
following several types of bus structures, including a
memory bus or a storage controller, a peripheral bus, and a
local bus. The processor and the internal memory may
perform data communication by using the system bus. The
internal memory includes a read-only memory (ROM) or a flash memory (not shown in the figure), and a random access
memory (RAM). The RAM is generally a main memory
loaded with an operating system and a computer program.

The computer device generally includes an external stor-
age device. The external storage device may be selected
from a plurality of computer-readable media. The computer-
readable medium is any available medium that can be
accessed by using the computer device, including two types
of media: a mobile medium and a fixed medium. For
example, the computer-readable medium includes but is not
limited to a flash memory (micro SD card), a CD-ROM, a
digital versatile disc (DVD) or another optical disc storage,
a magnetic tape cassette, a magnetic tape, a magnetic disk
storage, or another magnetic storage device, or any other
medium that may be used to store required information and
that can be accessed by the computer device.

The computer device may be logically connected to one
or more network terminals in a network environment. The
network terminal may be a personal computer, a server, a
router, a smartphone, a tablet computer, or another public
network node. The computer device is connected to the
network terminal through a network interface (local area
network LAN interface). The local area network (LAN) is a
computer network that is interconnected in a limited area,
such as a home, a school, a computer laboratory, or an office
building that uses network media. Wi-Fi and twisted pair
cabling Ethernet are the two most commonly used technolo-
gies for constructing LAN.

It should be noted that another computer system including
more or fewer subsystems than the computer device may
also be applicable to the present disclosure.

As described in detail above, the computer device appli-
cable to this embodiment can perform specified operations
of the test method based on a variable combination time
sequence function coverage. The computer device performs
these operations by running software instructions in the
computer-readable medium by using the processor. These
software instructions may be read into a memory from a
storage device or from another device through a local area
network interface. The software instructions stored in the
memory cause the processor to perform the foregoing test
method based on a variable combination time sequence
function coverage. In addition, the present disclosure may
also be implemented by using a hardware circuit or a
hardware circuit in combination with software instructions.
Therefore, implementation of this embodiment is not limited
to a combination of any specific hardware circuit and
software.

Embodiment 2

Figure 4:
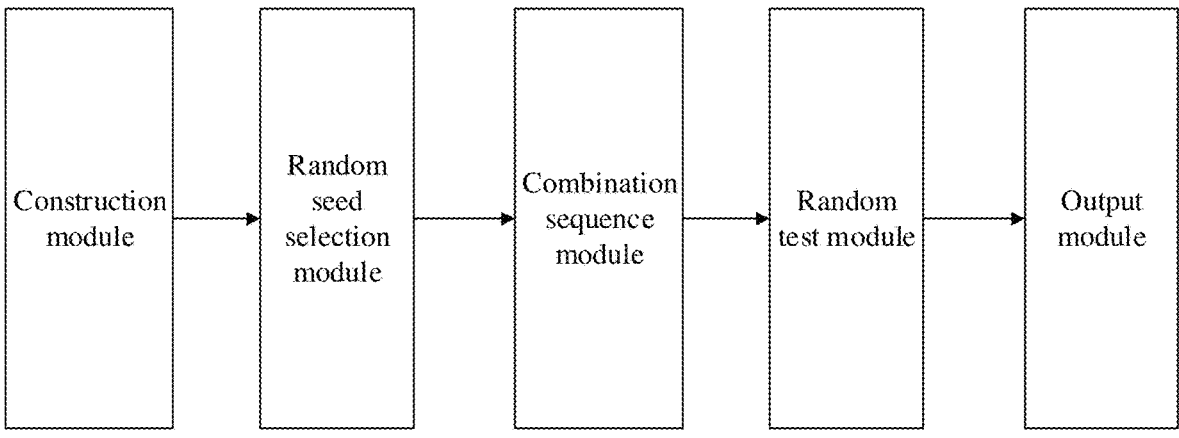
FIG. 4 is a schematic block diagram of a system according to an embodiment of the present disclosure.

This embodiment provides a test system based on a
variable combination time sequence function coverage. Spe-
cifically, as shown in FIG. 4, the system includes:

a construction module, configured to: construct a variable
combination time sequence function coverage structure
based on an actual verification requirement, and use the
variable combination time sequence function coverage
structure as a random constraint, where a specific
construction manner and the constructed variable com-
bination time sequence function coverage structure are
described in the foregoing Embodiment 1, and details
are not described herein again;

a random seed selection module, configured to determine
a random seed of each value range of each variable in
the variable combination time sequence function coverage structure, where a specific process is described in the foregoing Embodiment 1, and details are not described herein again;

a combination sequence module, configured to: sequentially obtain a time point as a current time point based on a time sequence of the variable combination time sequence function coverage structure, and obtain a value segment of each variable at the current time point from the variable combination time sequence function coverage structure, to form a variable combination structure at the current time point, where a specific process is described in the foregoing Embodiment 1, and details are not described herein again;

a random test module, configured to: for the variable combination structure at the current time point, generate a random excitation of each variable based on a corresponding random seed to perform testing in a current scenario, where a specific process is described in the foregoing Embodiment 1, and details are not described herein again; and an output module, configured to output a test result.

The objectives, technical solutions, and beneficial effects of the present disclosure are further described in detail in the above specific implementations. It should be understood that the above described are only specific implementations of the present disclosure and are not intended to limit the protection scope of the present disclosure. Any modification, equivalent replacement, improvement, and the like made within the spirit and principle of the present disclosure should fall within the protection scope of the present disclosure.

What is claimed is:

1. A test method based on a variable combination time sequence function coverage, comprising:

constructing a variable combination time sequence function coverage structure based on an actual verification requirement, and using the variable combination time sequence function coverage structure as a random constraint, wherein the variable combination time sequence function coverage structure is used to represent a relationship in which a single variable varies with time or a relationship in which a combination of at least two variables varies with time;

determining a random seed of each value range of each variable in the variable combination time sequence function coverage structure;

sequentially obtaining a time point as a current time point based on a time sequence of the variable combination time sequence function coverage structure;

obtaining a value segment of each variable at the current time point from the variable combination time sequence function coverage structure, to form a variable combination structure at the current time point;

for the variable combination structure at the current time point, generating a random excitation of each variable based on a corresponding random seed to perform testing in a current scenario for chip verification; and repeating the steps of sequentially obtaining a time point as a current time point based on a time sequence of the variable combination time sequence function coverage structure, obtaining a value segment of each variable at the current time point from the variable combination time sequence function coverage structure, to form a variable combination structure at the current time point, and for the variable combination structure at the current time point, generating a random excitation of each variable based on a corresponding random seed to perform testing in a current scenario for chip verification, until the entire time sequence is traversed;

wherein the method further comprises:

outputting a test result of a chip to be verified;

wherein the random seed is used to ensure that a random excitation generated in each test is capable of being reproduced.

2. The test method based on a variable combination time sequence function coverage according to claim 1, wherein the constructed variable combination time sequence function coverage structure is a three-layer structure;

curly brackets "{ }" are used at a first layer to indicate a time sequence of one variable or a combined time sequence of at least two variables;

square brackets "[ ]" are used at a second layer to indicate all value segments of each variable;

square brackets "[ ]" are used at a third layer to indicate a value range and/or a weight of each value segment; and quantities of value segments of the variables are the same, and are equal to a time sequence length.

3. The test method based on a variable combination time sequence function coverage according to claim 2, wherein the weight is used to represent a repetition quantity of the value range, and is represented by adding "*W" after the square brackets "[ ]" of the value range, and W represents a weight value.

4. The test method based on a variable combination time sequence function coverage according to claim 3, wherein the weight value W is less than or equal to the time sequence length N.

5. The test method based on a variable combination time sequence function coverage according to claim 4, wherein when the weight value W is equal to the time sequence length N, a default value is obtained.

6. The test method based on a variable combination time sequence function coverage according to claim 2, wherein the value range comprises a numerical value range in which first and last numerical values are equal or a numerical value range in which first and last numerical values are unequal.

7. The test method based on a variable combination time sequence function coverage according to claim 1, wherein the generated random excitation is as follows:

if the value range of the variable is a single numerical value, the single numerical value is directly returned as the random excitation; or if the value range of the variable is a numerical value range, a random number is generated in the numerical value range as the random excitation.

8. The test method based on a variable combination time sequence function coverage according to claim 3, wherein when the weight value W is 0, it indicates that a value range corresponding to the weight value is ignored, and the value range does not belong to a part of a sequence; and when the weight value W has a negative sign, the negative sign indicates an invalid sequence, and provided that a weight value W of a value range in a sequence has a negative sign, it indicates that the sequence is an invalid sequence.

9. A test system based on a variable combination time sequence function coverage, comprising:

one or more processors; and a non-transitory computer-readable storage medium storing instructions that, when executed by the one or more processors, cause the one or more processors to:

construct a variable combination time sequence function coverage structure based on an actual verification requirement, and use the variable combination time sequence function coverage structure as a random constraint, wherein the variable combination time sequence function coverage structure is used to represent a relationship in which a single variable varies with time or a relationship in which a combination of at least two variables varies with time;

determine a random seed of each value range of each variable in the variable combination time sequence function coverage structure;

sequentially obtain a time point as a current time point based on a time sequence of the variable combination time sequence function coverage structure, and obtain a value segment of each variable at the current time point from the variable combination time sequence function coverage structure, to form a variable combination structure at the current time point;

for the variable combination structure at the current time point, generate a random excitation of each variable based on a corresponding random seed to perform testing in a current scenario for chip verification;

repeat the sequentially obtaining a time point, the obtaining a value segment of each variable at the current time point, for the variable combination structure at the current time point, the generating a random excitation of each variable, until the entire time sequence is traversed; and output a test result of a chip to be verified;

wherein the random seed is used to ensure that the random excitation correspondingly generated is capable of being reproduced.

10. The test system based on a variable combination time sequence function coverage according to claim 9, wherein the constructed variable combination time sequence function coverage structure is a three-layer structure;

curly brackets "{ }" are used at a first layer to indicate a time sequence of one variable or a combined time sequence of at least two variables;

square brackets "[ ]" are used at a second layer to indicate all value segments of each variable;

square brackets "[ ]" are used at a third layer to indicate a value range and/or a weight of each value segment; and quantities of value segments of the variables are the same, and are equal to a time sequence length.

11. The test system based on a variable combination time sequence function coverage according to claim 10, wherein the weight is used to represent a repetition quantity of the value range, and is represented by adding "*W" after the square brackets "[ ]" of the value range, and W represents a weight value.

12. The test system based on a variable combination time sequence function coverage according to claim 11, wherein the weight value W is less than or equal to the time sequence length N.

13. The test system based on a variable combination time sequence function coverage according to claim 12, wherein when the weight value W is equal to the time sequence length N, a default value is obtained.

14. The test system based on a variable combination time sequence function coverage according to claim 10, wherein the value range comprises a numerical value range in which first and last numerical values are equal or a numerical value range in which first and last numerical values are unequal.

15. The test system based on a variable combination time sequence function coverage according to claim 9, wherein the generated random excitation is as follows:

if the value range of the variable is a single numerical value, the single numerical value is directly returned as the random excitation; or if the value range of the variable is a numerical value range, a random number is generated in the numerical value range as the random excitation.

16. The test system based on a variable combination time sequence function coverage according to claim 11, wherein when the weight value W is 0, it indicates that a value range corresponding to the weight value is ignored, and the value range does not belong to a part of a sequence; and when the weight value W has a negative sign, the negative sign indicates an invalid sequence, and provided that a weight value W of a value range in a sequence has a negative sign, it indicates that the sequence is an invalid sequence.

\* \* \* \* \*